US009514437B2

United States Patent
Becker et al.

(10) Patent No.: US 9,514,437 B2
(45) Date of Patent: Dec. 6, 2016

(54) APPARATUS AND METHODS FOR CREATION, COLLECTION, AND DISSEMINATION OF INSTRUCTIONAL CONTENT MODULES USING MOBILE DEVICES

(75) Inventors: Michael J. Becker, Half Moon Bay, CA (US); Aaron Cammarata, Fremont, CA (US); Peter A. Bonanni, III, Austin, TX (US); David S. Maynard, Menlo Park, CA (US); John Alan Main, Fairfax Station, VA (US); John R. Lowell, Fairfax, VA (US); Lawton Campbell, Austin, TX (US)

(73) Assignee: Cubic Corporation, San Diego, CA (US)

( * ) Notice: Subject to any disclaimer, the term of this patent is extended or adjusted under 35 U.S.C. 154(b) by 863 days.

(21) Appl. No.: 13/167,650

(22) Filed: Jun. 23, 2011

(65) Prior Publication Data
US 2012/0046770 A1 Feb. 23, 2012

Related U.S. Application Data

(60) Provisional application No. 61/376,226, filed on Aug. 23, 2010.

(51) Int. Cl.
*G06Q 10/10* (2012.01)
*H04L 29/06* (2006.01)
(Continued)

(52) U.S. Cl.
CPC .............. *G06Q 10/10* (2013.01); *G09B 5/125* (2013.01); *G11B 27/031* (2013.01);
(Continued)

(58) Field of Classification Search
USPC ....................................................... 434/308
See application file for complete search history.

(56) References Cited

U.S. PATENT DOCUMENTS 4,360,345 A * 11/1982 Hon ...................... G09B 5/065
434/262
7,464,272 B2 12/2008 Danieli
(Continued)

FOREIGN PATENT DOCUMENTS

WO 2008/112835 A1 9/2008

OTHER PUBLICATIONS

Search Report and Written Opinion of the International Search Authority in PCT/US2011/041689, dated Feb. 7, 2012.
(Continued)

*Primary Examiner* — James Hull
(74) *Attorney, Agent, or Firm* — Kilpatrick Townsend & Stockton LLP

(57) ABSTRACT

In one aspect, a mobile device comprises a local content store, one or more media playback components, one or more content capture components, and an instructional module agent comprising an authoring application and a playback application. The authoring application is configured to allow an author to create and edit instructional modules each comprising one or more media playback steps, each step comprising media that can be displayed or played, and to use the content capture components to capture content, store the captured content in the local content store, and configure at least one of the steps to display or play the captured content using the media playback components. The playback application is configured to play the instructional modules using the media playback components. The instructional module agent can be configured to respond to the creation and/or editing of an instructional module using the authoring application by automatically uploading at least a portion of the instructional module to a content repository stored on one or more computer servers.

10 Claims, 4 Drawing Sheets

(51) Int. Cl.
　　　H04N 21/2743　(2011.01)
　　　H04N 21/414　(2011.01)
　　　H04N 21/432　(2011.01)
　　　H04N 21/433　(2011.01)
　　　H04N 21/472　(2011.01)
　　　H04N 5/77　(2006.01)
　　　H04N 9/82　(2006.01)
　　　G11B 27/031　(2006.01)
　　　G09B 5/12　(2006.01)
　　　H04M 1/725　(2006.01)

(52) U.S. Cl.
　　　CPC ........... H04L 65/4084 (2013.01); H04N 5/77 (2013.01); H04N 5/772 (2013.01); H04N 9/8205 (2013.01); H04N 21/2743 (2013.01); H04N 21/41407 (2013.01); H04N 21/4325 (2013.01); H04N 21/4334 (2013.01); H04N 21/47205 (2013.01); H04M 1/72558 (2013.01)

(56) References Cited

U.S. PATENT DOCUMENTS

| | | | |
|---|---|---|---|
| 7,639,387 B2 * | 12/2009 | Hull et al. | 358/1.18 |
| 7,716,232 B2 | 5/2010 | Glenn | |
| 8,286,069 B2 * | 10/2012 | Gavin et al. | 715/202 |
| 8,707,150 B2 * | 4/2014 | Albu et al. | 715/201 |
| 2003/0163784 A1 * | 8/2003 | Daniel et al. | 715/514 |
| 2005/0019739 A1 * | 1/2005 | Cunningham et al. | 434/350 |
| 2005/0050062 A1 * | 3/2005 | Hanes et al. | 707/100 |
| 2006/0224046 A1 * | 10/2006 | Ramadas et al. | 600/300 |
| 2007/0111183 A1 | 5/2007 | Krebs et al. | |
| 2007/0162856 A1 * | 7/2007 | Schlossberg et al. | 715/730 |
| 2007/0189708 A1 * | 8/2007 | Lerman et al. | 386/52 |
| 2008/0010092 A1 * | 1/2008 | Smirniotopoulos | G06F 19/321 705/3 |
| 2008/0013916 A1 * | 1/2008 | Sharpe | G11B 27/034 386/278 |
| 2008/0101762 A1 * | 5/2008 | Kellock et al. | 386/52 |
| 2010/0036908 A1 | 2/2010 | Leblanc et al. | |
| 2010/0075288 A1 | 3/2010 | Sareday | |
| 2010/0142725 A1 * | 6/2010 | Goldstein et al. | 381/92 |

OTHER PUBLICATIONS

Extended European Search Report mailed Mar. 31, 2016 for European Application No. 11820309.0, filed Jun. 23, 2011; all pages.

* cited by examiner

APPARATUS AND METHODS FOR CREATION, COLLECTION, AND DISSEMINATION OF INSTRUCTIONAL CONTENT MODULES USING MOBILE DEVICES

CROSS-REFERENCE TO RELATED APPLICATIONS

This application claims priority from U.S. Provisional Patent Application No. 61/376,226, filed on Aug. 23, 2010, the entire disclosure of which is incorporated herein by reference.

STATEMENT REGARDING FEDERALLY SPONSORED R&D

The invention was made with Government support under Government Contract N65236-08-D-0010.

BACKGROUND

Field of the Invention

This application relates generally to the generation and distribution of instructional content, and specifically to the provision of such content on mobile devices.

Description of the Related Art

Mobile entertainment and communication devices that can be used for text editing, photograph capture, GPS localization, orientation sensing, audio recording, and video capture are now ubiquitous. These platforms serve as the end points of content distribution systems that disseminate said content from a central server to the mobile devices.

The creation of multimedia instructional content has involved, generally, a multi-step process. First, the creator of the instructional content plans one or more sessions for creating multimedia content, capturing the multimedia content using still cameras, video cameras, and the like, or otherwise obtaining the multimedia content. Second, the multimedia content is captured or otherwise obtained in accordance with the plan. Third, after the multimedia content is largely captured, the content is edited to have a specific format or higher production quality.

SUMMARY OF THE INVENTION

In one aspect, the present disclosure provides a mobile handheld computing device comprising a local content store, a network interface, one or more media playback components, one or more content capture components, an instructional module agent, and a computer system operative to implement the instructional module agent, to operate the one or more media playback components, the one or more content capture components, and the network interface, and to access the local content store. The network interface is configured to receive and transmit data via one or more data communication networks. The one or more media playback components are configured to display or play media, including media stored in the local content store and media received by the network interface. The one or more content capture components are configured to capture content and store the captured content in the local content store. The instructional module agent comprises an authoring application and a playback application. The authoring application is configured to allow an author to create and edit instructional modules each comprising one or more media playback steps, each step comprising media that can be displayed or played. The authoring application is also configured to use one of the content capture components to capture content, store the captured content in the local content store, and configure at least one of the steps to display or play the captured content using the one or more media playback components. The playback application is configured to play one of the instructional modules using the one or more media playback components, wherein playing an instructional module comprises playing at least one of the media playback steps of the instructional module. The instructional module agent is configured to respond to the creation and/or editing of an instructional module using the authoring application by automatically uploading at least a portion of the instructional module to a content repository of instructional modules stored on one or more computer servers, wherein uploading comprises using the network interface to transmit the instructional module via at least one of the one or more data communication networks.

In another aspect, the present disclosure provides a method of creating an instructional module using a mobile handheld computing device. The method comprises authoring one or more media playback steps, and responding to the creation and/or editing of the instructional module by automatically uploading at least a portion of the instructional module to a content repository of instructional modules stored on one or more computer servers. Each media playback step comprises media that can be displayed or played using one or more media playback components of the mobile device. Authoring at least one of the media playback steps comprises using a content capture component of the mobile device to capture content, storing the captured content in a local content store of the mobile device, and configuring the step to display or play the captured content. Said uploading comprises using a network interface of the mobile device to transmit the instructional module via at least one data communication network. The method is performed by the mobile computing device.

In another aspect, the present disclosure provides a computer-readable storage medium having one or more computer-executable modules adapted to install an instructional module agent onto a mobile handheld computing device. The instructional module agent comprises an authoring application and a playback application. The authoring application is configured to allow an author to create and edit instructional modules each comprising one or more media playback steps, each step comprising media that can be displayed or played using one or more media playback components of the mobile device. The authoring application is also configured to allow an author to use one or more content capture components of the mobile device to capture content, store the captured content in a local content store of the mobile device, and configure at least one of the steps to display or play the captured content using the one or more media playback components. The playback application is configured to play one of the instructional modules using the one or more media playback components, wherein playing an instructional module comprises playing at least one of the media playback steps of the instructional module. The instructional module agent is configured to respond to the creation and/or editing of an instructional module using the authoring application by automatically uploading at least a portion of the instructional module to a content repository of instructional modules stored on one or more computer servers. The uploading comprises using a network interface of the mobile device to transmit the instructional module via at least one data communication network.

In another aspect, the present disclosure provides a system for sharing instructional modules among a plurality of handheld mobile computing devices. The system comprises one or more computer hardware components implementing a plurality of servers. The instructional modules are organized into groups. Each server stores at least one of the groups. Each of the groups includes one or more of the instructional modules. Each of the instructional modules comprises one or more media playback steps, each step comprising media that can be displayed or played on at least one of the mobile devices using one or more media playback components of the mobile device. Each of the computer servers includes a repository application component configured to receive, from a mobile device, an update to at least a portion of at least one instructional module of at least one group stored on the server. Each repository application component is also configured to determine whether the mobile device has authorship permission to modify the at least one instructional module, and to respond to a determination that the mobile device has said authorship permission by modifying the at least one instructional module stored on the server, in accordance with the update.

In another aspect, the present disclosure provides a server for managing instructional modules for handheld mobile computing devices. The server comprises a content repository, a repository application component, and computer hardware for accessing the content repository and implementing the repository application component. The content repository stores one or more groups of instructional modules. Each of the instructional modules comprises one or more media playback steps, each step comprising media that can be displayed or played on one or more of the mobile devices using one or more media playback components of the mobile device. The repository application component is configured to receive, from a mobile device, an update to at least a portion of at least one instructional module of at least one group stored on the server. The repository application component is also configured to determine whether the mobile device has authorship permission to modify the at least one instructional module, and to respond to a determination that the mobile device has said authorship permission by modifying the at least one instructional module stored in the content repository, in accordance with the update.

In another aspect, the present disclosure provides a first mobile handheld computing device, comprising a local content store, a network interface, one or more media playback components, an instructional module agent, and a computer system operative to implement the instructional module agent, to operate the one or more media playback components and the network interface, and to access the local content store. The network interface is configured to receive and transmit data via one or more data communication networks. The one or more media playback components are configured to display or play media, including media stored in the local content store and media received by the network interface. The instructional module agent comprises a presentation authoring application, a playback application, and a group cooperation component. The authoring application is configured to allow an author to create and edit instructional modules each comprising one or more media playback steps, each step comprising media that can be displayed or played. The playback application is configured to play one of the instructional modules using the one or more media playback components, wherein playing an instructional module comprises playing at least one of the media playback steps of the instructional module. The group cooperation component is configured to define or join a group of handheld mobile computing devices, and use the network interface to communicate with a computer server associated with a content repository of instructional modules associated with the group, a portion of the content repository corresponding to the group being created at the instruction of the first mobile device or another mobile device of the group. The group cooperation component is also configured to obtain at least a portion of an instructional module stored in the content repository, and to upload to the content repository at least a portion of an instructional module authored or edited using the authoring application.

In another aspect, the present disclosure provides a computer-readable storage medium having one or more computer-executable modules adapted to install an instructional module agent onto a mobile handheld computing device. The instructional module agent comprises a presentation authoring application, a playback application, and a group cooperation component. The authoring application is configured to allow an author to create and edit instructional modules each comprising one or more media playback steps, each step comprising media that can be displayed or played using one or more media playback components of the mobile device. The playback application is configured to play one of the instructional modules using the one or more media playback components, wherein playing an instructional module comprises playing at least one of the media playback steps of the instructional module. The group cooperation component is configured to define or join a group of handheld mobile computing devices, and to use a network interface of the mobile device to communicate with a computer server associated with a content repository of instructional modules associated with the group, a portion of the content repository corresponding to the group being created at the instruction of the first mobile device or another mobile device of the group. The group cooperation component is also configured to obtain at least a portion of an instructional module stored in the content repository, and to upload to the content repository at least a portion of an instructional module authored or edited using the authoring application.

In another aspect, the present disclosure provides a mobile handheld computing device comprising a local content store, a network interface, one or more media playback components, one or more content capture components, an instructional module agent, and a computer system operative to implement the instructional module agent, to operate the one or more media playback components, the one or more content capture components, and the network interface, and to access the local content store. The network interface is configured to receive and transmit data via one or more data communication networks. The one or more media playback components are configured to display or play media, including media stored in the local content store and media received by the network interface. The one or more content capture components are configured to capture content and store the captured content in the local content store. The instructional module agent comprises a presentation authoring application and a playback application. The authoring application is configured to allow an author to: create and edit instructional modules each comprising one or more media playback steps, each step comprising media that can be displayed or played; use one of the content capture components to capture content, store the captured content in the local content store, and configure at least one of the steps to display or play the captured content; configure a media playback step of a first instructional module to instruct a user playing the step on a handheld mobile computing device to use a content capture component of the user's mobile device to capture specific content; configure the first instructional module to instruct the instructional module agent, when playing the step of the first instructional module, to send the captured specific content to a media diagnosis system configured to analyze the captured specific content; and provide instructions in the first instructional module for receiving the media diagnosis system's analysis of the captured specific content, and for selecting a next media playback step of the first instructional module to play based on the analysis. The playback application is configured to play one of the instructional modules using the one or more media playback components, wherein playing an instructional module comprises playing at least one of the media playback steps of the instructional module.

In another aspect, the present disclosure provides a method of playing an instructional module on a handheld mobile computing device. In accordance with the method, an instructional module comprising one or more media playback steps is accessed, each step comprising media that can be displayed or played using one or more media playback components of the mobile device. One of the media playback steps is played using the one or more media playback components of the mobile device, wherein playing the media playback step comprises instructing a user of the mobile device to use a content capture component of the mobile device to capture specific content. The captured specific content is sent to a media diagnosis system configured to analyze the captured specific content. The media diagnosis system's analysis of the captured specific content is received. A next media playback step of the instructional module is selected, based on the analysis. The next media playback step is played using the one or more media playback components. The method is performed by the mobile computing device.

For purposes of summarizing the invention and the advantages achieved over the prior art, certain objects and advantages of the invention have been described above and as further described below. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

The features, objects, and advantages of the disclosed embodiments will become more apparent from the detailed description set forth below when taken in conjunction with the drawings, in which like reference characters identify correspondingly throughout and wherein.

DETAILED DESCRIPTION OF THE PREFERRED EMBODIMENTS

Overview

Figure 1:
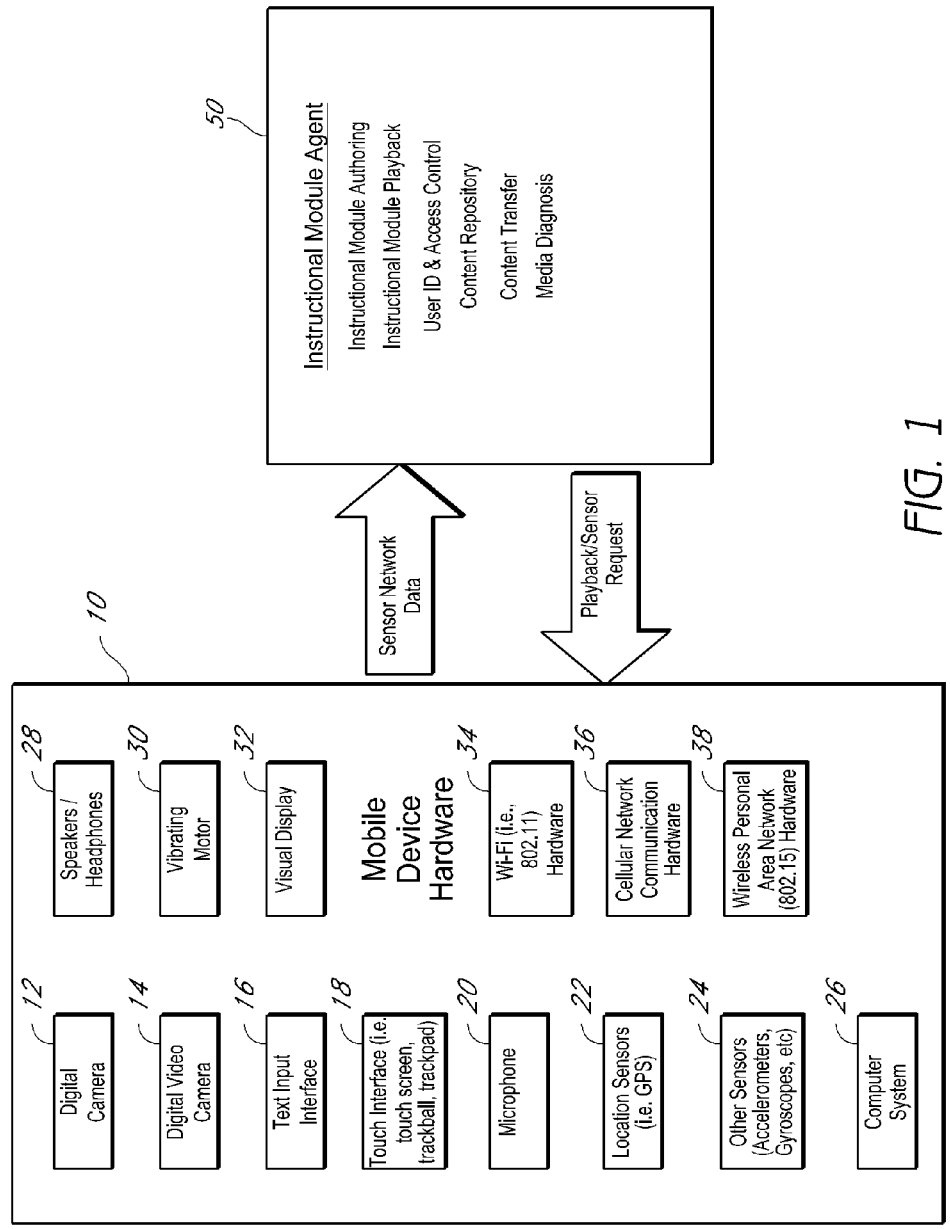
FIG. 1 is a system and data flow diagram that shows an embodiment of a mobile device hardware and software configuration, and indicates how, in one embodiment, data passes between the mobile device hardware and resident authoring software.

Unfortunately, existing methods for creating multimedia instructional content or reference materials are limited due to the separation in time and place between the first, second, and third stages described above. In the second stage, it is not currently possible to edit the multimedia content to a higher level production quality immediately after the content is captured or otherwise obtained. Further, the third stage (editing) is typically characterized by an inability to meaningfully or significantly recapture or obtain new multimedia content based on the outcomes of editing activities. For example, once a scene is edited, the author may realize that it would benefit from an additional scene. However, in the existing paradigm, it may not be possible to capture the new scene, because the elements necessary for the scene (e.g., equipment, individuals) are not available. Also, an author may capture multimedia content with an idea of how it is to be edited, but simply forget details of the editing plan when the editing stage arrives, typically much later.

Embodiments of the present invention overcome these limitations by providing a mobile device that merges together, in one device, the creation, editing, and playback of multimedia presentations such as instructional content, as well as the capture and editing of portions of the content. These embodiments allow a user of a mobile device to author presentations (referred to herein as "instructional modules") spontaneously, taking advantage of momentary opportunities to both capture and edit multimedia content that may not otherwise be available for capture. In other words, a user that is experiencing or doing something in a specific time and place can use a mobile device to capture that something and create and edit an instructional module associated with it, all while the user is in said specific time and place. As used herein, "instructional content" and an "instructional module" can include content that is merely informative, even if it has minimal or no instructional value.

Existing mobile device platforms and applications, including so-called social networking applications, enable new content distribution network topologies by utilizing a method whereby the mobile device user can create relevant content for these applications, such as text, images, and/or video. In one aspect, the present application provides an authoring application having a content editor for a handheld mobile device.

The present application provides a novel instructional method where every individual user of a smart phone or similar mobile device can become an instructional content author. Quality of content is enhanced in several ways. First, many different authors can create instructional content on a given topic, thus providing a broader range of instructional approaches. Second, all of the content can be made available to smart phone and mobile device users and rated by those same users. The ratings can be displayed to users (e.g., on their mobile devices, home computers, laptops, PDA's, and the like) to guide content selection.

Accordingly, embodiments of the invention include methods and systems that enable and facilitate the creation of instructional content using a smart phone or similar mobile device, and that make available and deliver the content authored on smart phones and mobile devices to other smart phone or mobile device users.

Embodiments of the invention facilitate the creation of instructional modules in the form of "step by step" instructions or "branching step by step" instructions on a mobile entertainment and communication device and subsequent delivery of that instructional content to other mobile entertainment and communication device users. A software application (or "instructional module agent") resident on the mobile device can provide impromptu content authoring and editing tools in the field that enable creation of instructional content including, for example, text, drawings, maps, pictures, audio, and/or video. The resulting instructional content module can then be replayed on the same mobile device or transferred to a content repository. The content repository may be on a central server, the same mobile device, or another mobile device and can provide tools for functional assessment, content appropriateness, and quality control. A user identification and access control application can provide user authentication and appropriate controls to restrict transfer of instructional content to authorized users. A content transfer system can be configured to initiate and manage transfer of an instructional module and its descriptive data between content repositories.

Nomenclature

The terms "author" and "content creator" are used to refer to the creator and/or editor of instructional content using a smart phone or other mobile device.

The term "user" is any person who utilizes any aspect of the described systems and apparatuses. One type of user is a viewer of instructional content on a smart phone, other mobile device, or other networked computing device, either using a web browser or application-specific software. A "user" can be an "author" or "content creator."

The terms "content repository" or "content store" refer to a database that contains instructional content as well as, preferably, software used to manage and run said database. A version or portion of this database can be stored on the mobile device, and is referred to as a "local content store."

The terms "mobile entertainment and communication device," "device platform," "smart phone," and "mobile device" refer to electronic devices (preferably of handheld size) designed and built for the consumer marketplace, and which have the capability to communicate via wired and/or wireless data networks. These devices preferably support voice, text, images, audio, video, and/or other multimedia communication and may also contain sensors to capture and digitize, for example, photographs, video, audio, device orientation, location information and/or other environmental data.

The term "mediator" is used to refer to a person or software that evaluates instructional content to determine quality and/or appropriateness.

The term "voter" is used to refer to a user who provides a quality rating for a module. Software that provides a quality rating for a module is referred to as a "software voter".

A set of "step by step" instructions comprises sequenced instructions for presenting presentation content on a mobile device or other device.

A set of "branching step by step" instructions comprises instructions whose sequence of presentation depends upon other data, such as user-related data (e.g., a user's responses to queries) or data captured using sensors of a mobile device on which the presentation is made. This other data can determine which "branches" of the instructions will be executed.

As used herein, terms such as "application," "agent," "component," "tool," "service," "portal," "system," and "interface" can comprise software, firmware, hardware, or a combination thereof, can be designed to accomplish an operational function, and may consist of multiple programs. Further, any software application components described separately herein can be combined together into a single software application.

DETAILED DESCRIPTION

The detailed description herein is presented for purposes of illustration only and not to limit the invention. Details of network data transfer, software system architecture, user permissions, encryption, network security, and other functional embodiments of the components and systems may not be described in detail herein for the sake of brevity.

This application describes various systems and methods. It will be appreciated that all of these systems and methods can be implemented at least partially by one or more computer systems comprising one or more computing devices and associated peripheral hardware, firmware, and software, such as computer-readable data storages, communication hardware, cameras for image and video capture, microphones for audio capture, and the like.

Figure 2:
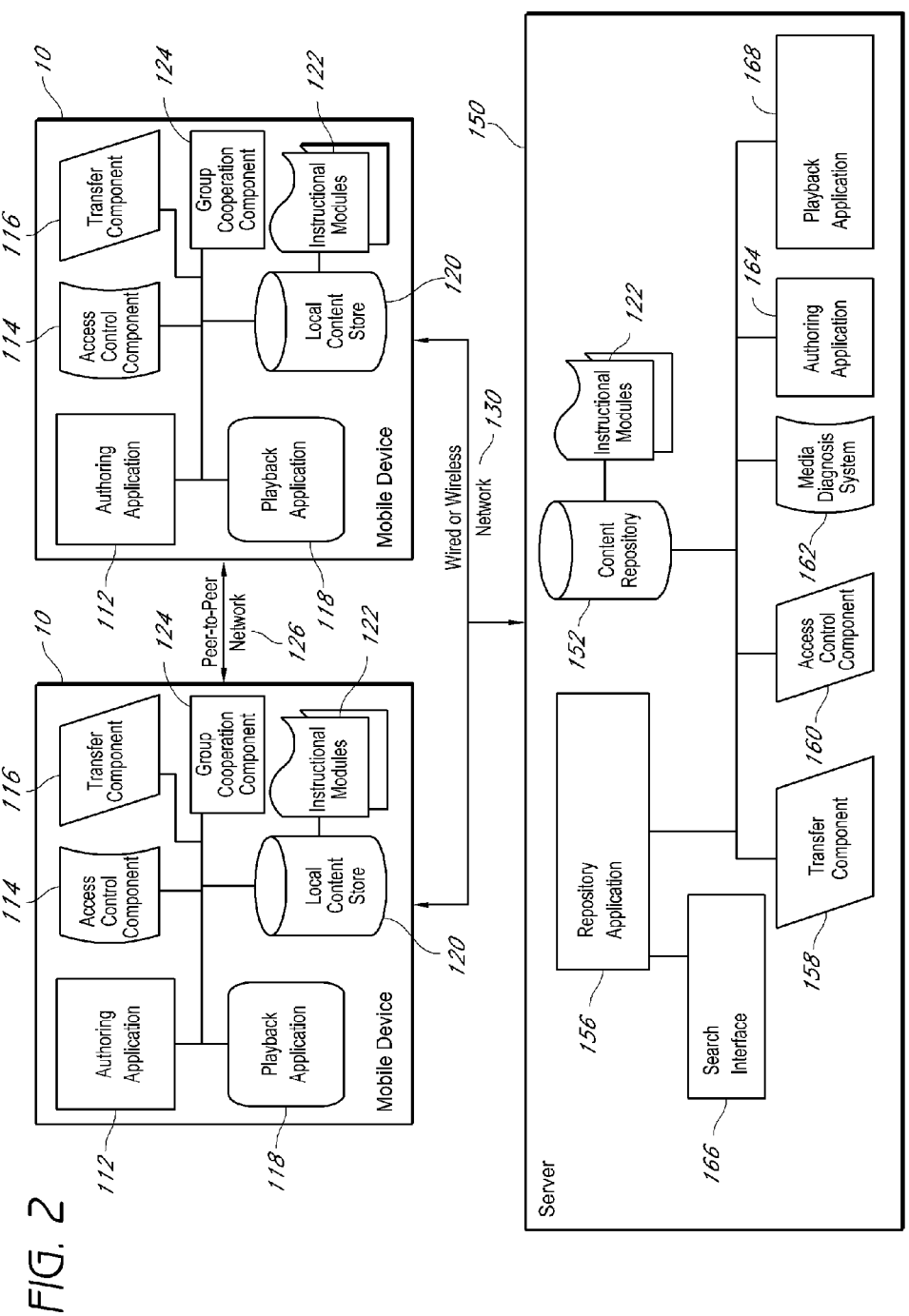
FIG. 2 is a system diagram illustrating a distribution of functions among mobile devices and another computer functioning as a server for a larger content repository, in accordance with an embodiment of the invention.

In certain embodiments, the present invention provides an overall instructional content creation, collection, and distribution system comprising multiple parts. FIGS. 1 and 2 illustrate one of many diverse embodiments of such a system, whereas FIG. 3 illustrates the type of content that can be stored within an instructional module.

Figure 3:
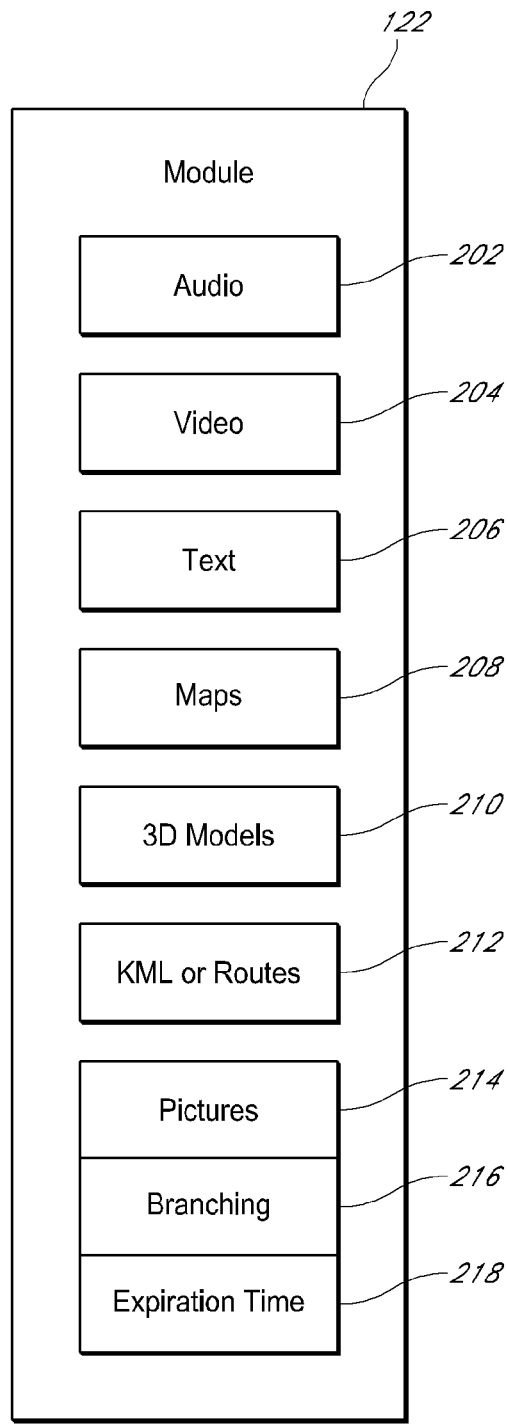
FIG. 3 is a schematic diagram of an embodiment of an instructional module.

Referring now to FIGS. 1-3, a mobile device 10 includes an instructional module agent 50 comprising at least an authoring application 112 and a playback application 118. In various embodiments described below, the instructional module agent 50 can also include a group cooperation component 124 and other features. It will be understood that the instructional module agent's features listed in FIG. 1 represent just one example, and that an instructional module agent 50 can include only some or all of the listed features, as well as additional features not listed, with any sub-combination of the listed features included. It will be understood that the mobile device 10 can include a computer hardware, software, and/or firmware system 26 (e.g., microprocessor, memory chips, OS, etc.) to implement the various components of the instructional module agent 50, as well as to access the content capture components, media playback components, and user interface components of the mobile device.

One part of the total system is a content authoring and editing application or application component (or, more simply, "authoring application") 112 resident on a smart phone or mobile device 10. It will also be understood that a similar authoring application 164 can be provided on a server 150. The authoring application 112 preferably enables creation of an "instructional module" 122 containing "instructional content." In some embodiments, "instructional content" comprises one or more sets of instructions. These instructions can comprise a "step-by-step" or "branching step-by-step" sequence, but may take a less structured form. A "module"

or "instructional module" 122 can comprise a single set of instructions, which may in turn include nested sets of instructions forming sub-modules that are capable of standing alone as modules 122 in the context of different instructional tasks.

Preferably, the authoring application 112 is configured to use one or more content capture components of the mobile device 10 to capture content, store the captured content in the local content store 120, and configure at least one of the media playback steps to display or play the captured content using one or more media playback components of the mobile device 10. Examples of content capture components and media playback components are described below.

Preferably, the authoring application 112 is configured to allow the user to describe or enhance the instructional steps contained within a module 122 by one or more of text input 206 from a text input interface 16 (e.g., a device keyboard, keypad (virtual or actual), drawings or photographs 216, maps 208, audio commentary and other audio information 202, video 204 (e.g., video demonstrations), 3D models 210 and/or animations, information from data files, other software components (such as Java applets), or combinations of these media. The module 122 can also include KML (keyhole markup language) data or travel routes 212 (KML is an XML notation for expressing geographic annotation and visualization within Internet-based 2D maps and 3D Earth browsers), branching logic 216 (e.g., for selecting a next media playback step to be played, as programmed by an author), or an expiration time 218 setting an auto-disabling or deletion of the module 122 at a specified time or at the expiration of a specific time duration. The authoring application 112 can include tools to capture instructional material using the hardware and software native to the mobile platform, or using material gathered from other data sources such as other mobile devices 10, computers and servers connected to the Internet, or material contained within the aforementioned instructional content repositories.

In some embodiments, the authoring application 112 is configured to facilitate the authoring of modules 122 that are replayed or executed predominantly in a step-by-step fashion. The authoring application 112 can be configured to allow an author to explicitly define sequences of steps. Further, the authoring application 112 can support the authoring of branching queries and actions, so that the playback application 118 selects and plays back instructional content based upon queried data. The queried data can comprise, for example, a content-viewing user's (or, a "viewer's") responses to inquiries programmed into the module 122 by the author, such as yes/no or multiple-choice questions. The queried data can alternatively comprise data captured or recorded by "content capture components" or sensors of the mobile device 10, such as audio captured from a microphone 20, images or video captured from a camera (such as the digital cameras 12 and 14 of FIG. 1), location data obtained from GPS or other types of location sensors 22, and information obtained using sensors 24 such as accelerometers (e.g., orientation, displacement, velocity, and acceleration of the mobile device) or gyroscopes. In some embodiments, the authoring application 112 is configured to implement less structured step sequences as may be desired by the author, including randomized step order. The authoring application's editing functionality can allow the author to edit individual step content, reorder steps, and/or change branching behavior.

Thus, in certain embodiments, the authoring application 112 can be configured to allow an author to define a sequence in which the media playback steps of an instructional module 122 are played, conditions under which the sequence is to be altered, and one or more alternative sequences to be followed for each satisfied condition. When one of the conditions is met, the playback application 118 uses this information to select the next media playback step to play.

Preferably, the authoring application 112 is configured to allow an author to edit an instructional module 122 to include annotation or superimposed text onto images or video content. Similarly, the authoring application 112 can also be configured to allow the author to add audio or video tracks to existing audio or video content. For example, the author might want to superimpose verbal commentary from the author or other individuals. These features allow the author to create more effective and useful instructional modules. Further, the ability to annotate text or superimpose audio or video directly at the mobile device enhances the author's ability to author high quality instructional content more consistently, by providing a fuller editing suite that the author can access immediately after the author has captured or otherwise obtained the images or video to be annotated. This merging of the filming and editing activities in one device enhances the quality of both, because the author can more quickly evaluate the impact of either one on the other and modify either while still in the filming process. It will be appreciated the authoring application can allow the author to provide the text annotation either within a sidebar associated with particular imagery or video, superimposed on the imagery or video, or both.

In some embodiments, the instructional module agent 50 is configured to respond to the creation and/or editing of an instructional module 122 using the authoring application 112 by uploading (e.g., automatically) at least a portion of the instructional module 122 to a content repository 152 of instructional modules stored in association with a server 150. The upload can be sent through one or more data communication networks (wired and/or wireless) 130. In this manner, as content is authored, it is automatically made available to other mobile devices 10, either by the server pushing the content thereto or by the other devices otherwise accessing the content from the server. This can also apply to deleted content, such that the authoring application 112 responds to the deletion of a media playback step or an instructional module by sending delete instructions to the server 150, and the deletion may then be propagated to other mobile devices.

In certain embodiments, this automatic uploading preserves access restrictions to the authored content. For example, the author can restrict access only to the members of a defined group of mobile devices. In some embodiments, when the instructional module 122 is authored using the authoring application 112, the instructional module agent 50 is configured to (1) receive (e.g., after prompting the user) a selection of one or more presentation groups of the presentation groups associated with the content repository 152, and (2) send the selection to the server 150 during said automatic uploading of the authored instructional module 122 to the content repository 152.

In some embodiments, an author or editor of instructional modules may wish to regulate the pace at which such content is shared with other mobile devices. For example, if a team leader in a military operation decides to change tactics during the operation, the team leader may wish to make available to the team members' mobile devices only those instructional modules that are relevant for the next phase of the operation. Preferably, the authoring application 112 includes a feature that allows the author or editor to choose which authored or edited content will be uploaded to the server 150 or directly transferred (peer-to-peer) to the mobile devices of the team.

In certain embodiments, another part of the aforementioned instructional content creation, collection, and distribution system is a content playback application component (or, more simply, "playback application") 118 resident on the mobile device 10. The playback application 118 preferably enables a user to select and execute a particular instructional module 122. The playback application 118 is preferably configured to play one of the instructional modules 122 using one or more media playback components of the mobile device 10, such as a visual display or screen 32, one or more audio speakers or a headphone jack 28, and/or a vibrating motor 30. The media playback components can be configured to display or play the media, including media stored in the local content store 120 and/or media received by the mobile device's network interface. The playback application 118 can be configured to play an instructional module stored in the local content store by (1) retrieving, from the local content store, a media playback step of the instructional module, (2) retrieving, from the local content store, media associated with the retrieved media playback step, and (3) displaying or playing the retrieved media using the one or more media playback components. Similarly, the playback application 118 can be configured to play an instructional module stored on another computer connected to one of the data communication networks by (1) using the network interface to retrieve, from the other computer, a media playback step of the instructional module, (2) using the network interface to retrieve, from the other computer, media associated with the retrieved media playback step, and (3) displaying or playing the retrieved media using the one or more media playback components. In addition to the playback application 118 on the mobile device, a similar playback application 168 can be provided on the server 150.

In these contexts, playing an instructional module 122 comprises playing at least one of the media playback steps of the instructional module. The playback application 118 executes modules 122 that can feature audio, visual, and even tactile (e.g., vibration) information as part of the presentation. In this application, "playback" and "play" are broad terms that encompass, e.g., the displaying of text, images, video, maps, directions, 3D models, and other media. "Playback" and "play" also encompass, e.g., the playing of audio, including audio combined with video.

As noted above, the playback application 118 also can use sensors on the mobile device 10 to provide feedback that can be automatically diagnosed by a media diagnosis system 162 on the mobile device 10 or on a backend server 150, to select and/or recommend instructional content to be played back. For example, a module 122 that provides instruction on installing a kitchen cabinet can include a step that utilizes accelerometers in the mobile device 10 to determine if the cabinet is properly leveled, as well as one or more steps instructing how to correct improper execution of prior steps. This diagnosis, selection, and/or recommendation may or may not involve communication with the server-based repository application 156 and/or content repository 152. In another example, a module 122 can instruct the user to use the mobile device 10 to record the sound of an engine. The diagnosis system 162 on the mobile device 10 or on a backend server 150 can automatically compare the sound against a library of engine sounds to determine if the engine is working properly. If the engine is determined to not be working properly, the diagnosis system 162 or the playback application 118 can select and/or recommend instructional content for repairing the engine. In this example, the analysis of the engine sound could be performed on the mobile device itself or sent back to a server for analysis, and an appropriate branch of module instructions could be brought to the user's attention as a result of the analysis. In another example, a skin rash diagnosis and treatment module can compare images taken by the mobile device's camera to a library of images representative of known skin rashes to select an appropriate branch of treatment instructions. These embodiments are meant to be representative of the larger set of possibilities engendered by utilizing direct capture of content for comparison within an instructional module.

In certain embodiments, another part of the aforementioned instructional content creation, collection, and distribution system is a user identification and access control application component (or, more simply, an "access control component"). Preferably, one access control component 114 is included on the mobile device 10 (preferably as part of the instructional module agent 50), and another access control component 160 is provided on the server 150. The access control component 114 can be shared between the local content store 120 and the content transfer application component (or, more simply, the "transfer component") 116. Similarly, the access control component 160 can be shared between the content repository 152 and the transfer component 158.

In one embodiment, the access control component 114 and/or 160 can be configured to determine the identity of a user based on information stored on the user's mobile device or entered by the user. The access control component 114 and/or 160 can use this identity information to limit the user's access to the content repository 152, and to display to the user only an appropriate subset of the content repository 152 based upon, for example, the security or classification level possessed by the user, purchased license restrictions (such as basic or professional application version, previously purchased instructional modules, etc.), or self-configured user interest profile settings. These user-related data may be stored either on the user's mobile device or the content repository 152, shared among them, or mirrored on both. These user-related data can comprise associations between user's identity and instructional content and modules 122 that the user has created. The transfer component 116 and/or 158 can be configured to use this associative data to implement, e.g., restrictions on transfer of the instructional modules 122, such as to facilitate payments for a user to acquire instructional content that the user did not author. The transfer component 116 and/or 158 can be configured to implement such a transfer restriction regardless of whether the transfer occurs locally (such as can occur via a local private network such as Bluetooth), in a peer-to-peer manner (such as between individually identifiable devices connected to a common peer-to-peer network 126), or with a central server (such as the content repository 152). The access control component 114 and/or 160 preferably determines if any conditional restrictions must be met in order for content transfer to be permissible. In some embodiments, in which a user requests a peer-to-peer transfer of specific content from another user's source device to the requesting user's destination device, the access control component 114 and/or 160 also determines whether the source device or its user has appropriate permissions for the transfer to the destination device, and restricts the transfer if such permissions have not been granted to the source device or its user.

Referring to FIG. 1, the transfer component 116 of the mobile device 10 can be configured to utilize a network interface configured to receive and transmit data via one or more data communication networks, such as the illustrated networks 126 and 130. For example, the mobile device 10 can include Wi-Fi hardware 34 (e.g., 802.11), cellular network communication hardware 36, wireless personal area network hardware 38 (e.g., 802.15), and/or other communication hardware.

In certain embodiments, another part of the aforementioned instructional content creation, collection, and distribution system is a content repository application component (or, more simply, a "repository application") 156. The content repository 152 is a database that is accessed via a computer network, such as the Internet or a smaller wide or local area network. The repository application 156 preferably has tools for categorizing modules 122 using characteristic organizational methods such as alphabetical listing, subject listing, keyword listing, or search. The repository application 156 preferably utilizes assurance and appropriateness controls via a system of human and/or software mediators who determine module functionality and appropriateness of content for distribution (for instance, age or ratings of the content). The repository application 156 also preferably has a quality control function utilizing human and/or software voters who determine the module quality, for example how well the module performs in providing instruction towards the intended goal. The repository application 156 can also provide links to virtual communities built around the instructional content. Such a virtual community can include chat, email and commentary posting features, author and module rating systems, and links to other social networking applications. The content repository 152 may also incorporate or provide links to a learning management system (LMS) that a user can execute or edit on a mobile device. The mobile device application components described herein can be configured to execute instructional content that is compliant with SCORM (Sharable Content Object Reference Model), which is a well-known collection of standards and specifications for web-based e-learning. Further, the mobile device 10 can include an LMS component that tracks a student's progress through instructional content (e.g., via quizzes or other forms of testing), for the purpose of selecting, recommending, and or displaying a next portion of instructional content to the student based on the student's satisfaction of defined learning goals. Finally, each mobile device may have a local content store 120, which mirrors some or all of the functionality of the larger content management system, most significantly but not limited to the access control functions and basic organizational functions.

In certain embodiments, the repository application 156 is configured to regulate mobile device access to the content repository 152 based on permissions data associated with the mobile devices. In some implementations, each of the instructional modules 122 can be assigned to one or more of a plurality of groups (described below) of users, each group having one or more user-members. A permissions data structure can include permissions data for determining whether users of mobile devices have permission to access and/or edit instructional modules stored in the content repository 152. For example, access to and/or authoring/editing privileges for instructional modules 122 associated with a user group can be restricted to mobile devices assigned to users who are members of the group.

One or more repository management tools (such as the repository application 156 and/or access control component 160, described elsewhere herein) can be configured to (1) receive, from a mobile computing device, an instructional module 122 authored on the mobile device, along with a group identification associated with the received instructional module, (2) access the permissions data structure to determine whether a user associated with the mobile device has authorization to add the instructional module to one or more groups identified by the group identification; and (3) respond to a determination that the user has said authorization by storing the received instructional module in the content repository 152 and assigning the received instructional module to the one or more groups identified by the group identification. If the user does not have the authorization, then the one or more repository management tools can be configured to refuse to store the received instructional module 122 in the content repository 152 (or at least in the portion of the repository reserved for the group). Similar access determinations (i.e., checking the permissions data structure to determine whether to grant access to a mobile device or other computing device) can be conducted when a user attempts to download, delete, or edit an instructional module.

The one or more repository management tools can be configured to allow an administrator to regulate the repository content, user groups, content groups, permissions data structure, and associated elements. Preferably, the one or more repository management tools are configured to allow an administrator do one or more of the following:

- view, for any one of the groups, a listing of user-members assigned to the group;
- view, for any one of the groups, a listing of instructional modules assigned to the group;
- adjust assignments of user-members to the groups;
- adjust assignments of instructional modules to the groups;
- select and play any of the instructional modules;
- select, display, or play media of any of the playback steps;
- edit any of the instructional modules;
- edit any of the media playback steps;
- edit any of the media associated with the media playback steps;
- delete any of the instructional modules;
- delete any of the media playback steps; and
- delete any of the media associated with the media playback steps.

In certain embodiments, another part of the aforementioned instructional content creation, collection, and distribution system is a content transfer application component (or, as noted above, a "transfer component"). In some embodiments, there is one transfer component 116 stored on the mobile device 10 (preferably as part of the instructional module agent 50), and another transfer component 158 stored on the server 150. The transfer component 116 and/or 158 can be configured to utilize any of one or more various different communication networks 130 accessible via the mobile device 10, including but not limited to private networks and the Internet, to transfer instructional modules 122 between content stores 120 and 152. The networks may be wired or wireless, or combinations thereof. The transfer component 116 and/or 158 can preferably utilize the access control component 114 and/or 160 to determine whether a requested or particular content transfer is permitted, and if so, whether there are any pre-conditions that must be met before transfer can occur.

In certain embodiments, a plurality of servers 150 is provided, each including some or all of the elements shown in FIG. 2. In certain implementations, at least some of the servers are logical and do not represent physically separate hardware components, and some of the servers are stored on the same hardware component. In other implementations, each server is a separate hardware component. The instructional modules 122 of the various content repositories 152 can thereby be distributed among the plurality of servers. Preferably, the instructional modules 122 are organized into groups, with each server storing one or more of the groups. Preferably, each of the groups includes one or more of the instructional modules 122. As described elsewhere herein, each of the instructional modules can comprise one or more media playback steps, each step comprising media that can be displayed or played on at least one of the mobile devices 10 using one or more media playback components of the mobile device.

All content in the total system can be represented as a simple object graph, which can be sharded onto multiple servers, preferably by group. Each object of the global graph can represent any component of an instructional module, such as an audio file, video file, text, etc. For each group, there is preferably one authority, typically a server. This can allow a group of devices, e.g. "Team Alpha," to host their own server and place the server on the network as the authority for Team Alpha's group. The system can require that all changes to the content of that group must go through that server, and can then be propagated to other servers and/or mobile devices on the network, assuming (in some embodiments) that they have appropriate authorization. In certain embodiments, each group can choose to configure its server to keep specific content private by not distributing it to mobile devices that are not associated with the group or team (e.g., non-members of Team Alpha). In this approach, it is possible for different servers to have overlapping instructional module content. However, even if this is the case, there is preferably only one server that is the authority for each instructional module.

Figure 4:
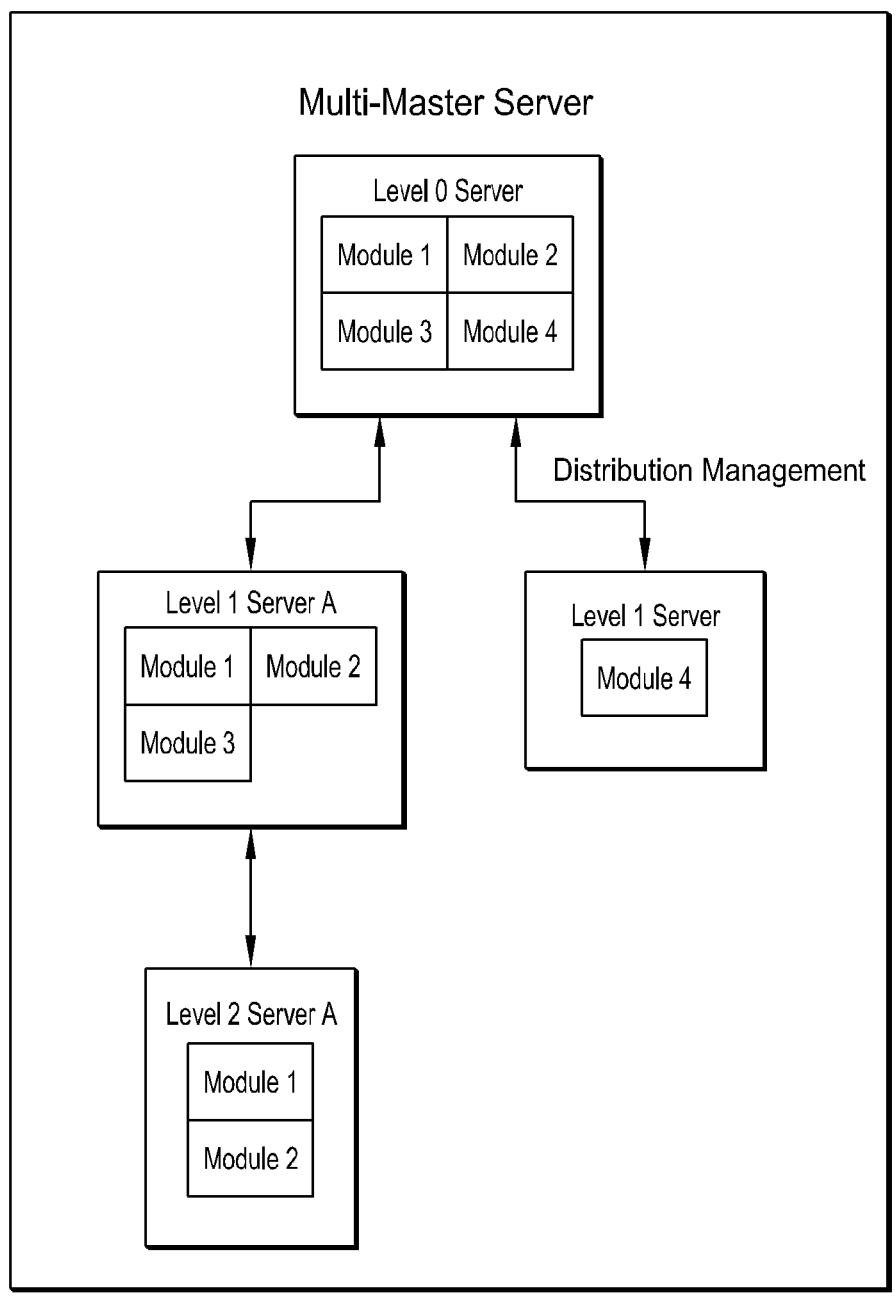
FIG. 4 a schematic diagram of an object graph of instructional module groups stored in association with a plurality of servers.

FIG. 4 shows an embodiment of a simplified object graph of content. In this embodiment, a Server A of Level 0 contains four modules associated with one mobile device group, a Server A of Level 1 contains three modules associated with another group, a Server B of Level 1 contains a fourth module of Level 1 for another group, and a Server A of Level 2 contains two modules of yet another group. In this embodiment, the servers are organized into a hierarchy. Hierarchical organization can be useful for regulating permissions. In one possible scheme, a server has permission to copy some or all of the instructional content stored on any server above it in the hierarchy, but does not have permission to copy any of the instructional content stored on any server below it in the hierarchy. It will be understood that many alternative implementations for hierarchy-based permissions are possible.

In this context, the mobile devices 10 can act as caching browsers of the object graph. The mobile devices 10 can make local modifications to their cached portion(s) of the global object graph, and effectively push those changes onto the network to be propagated to other mobile devices viewing those portions of the graph. This can include content updates, additions, and also deletions, such that an authorized mobile device user can "expire" content at any time, by simply deleting the content on his or her mobile device.

A scheme for setting permissions for group members (i.e., users) and/or instructional modules is now described, in accordance with one embodiment. Each group member, when added to the group, can be given browse permission, read permission, authorship permission, and/or edit permission. Browse permission gives the group member the permission to view titles and/or other information describing the instructional modules of a group. Read permission gives the group member the permission to play instructional modules of the group, on the group member's mobile device or other computing device. Authorship permission gives the group member permission to add newly authored instructional modules to the group. Finally, edit permission gives the group member permission to edit instructional modules downloaded from the content repository associated with the group. It is understood that the terms "browse," "read," "authorship," and "edit" are examples, and other terms could be used instead.

Next, each instructional module, when added to the group, can be given browse status, read status, and/or edit status. Browse status means that a title and/or other information describing the instructional module can be shown on group members' devices. Read status means that the instructional module can be played on group members' devices. Edit status means that the instructional module can be edited by group members, who can then save the edited version into the content repository that is the authority for the group.

The system can be configured to resolve the permissions for a specific pairing of a group member and instructional module, by conducting a Boolean AND of the group member's permissions with the module's permissions. For example, suppose that a User00 has browse permission, read permission, and write permission to a Group00 which contains instructional Module00 authored by User01. Also suppose that when User01 added Module00 to Group00, User01 gave Module 00 browse status and read status, but not edit status. If User00 attempts to write to Module00, the system conducts a Boolean AND of User00's privileges to Group00 (browse permission, read permission, and write permission) with Module00's permissions (browse status and read status). This results in User00 only having authorization to browse and read Module00, but not to edit it.

In certain embodiments, each of the computer servers can include a repository application 156, content repository 152, instructional modules 122, transfer component 158, access control component 160, media diagnosis system 162, authoring application 164, and/or playback application 168, as described elsewhere herein. One or more of these server components (e.g., the repository application 156) can be configured to update locally stored content received from the mobile devices. Specifically, such a set of components can be configured to (1) receive, from a mobile device 10, an update to at least a portion of at least one instructional module of at least one group stored on the server, (2) determine whether the mobile device has authorship permission to modify said at least one instructional module, and (3) respond to a determination that the mobile device has said authorship permission by modifying the at least one instructional module stored on the server, in accordance with the update. For example, the repository application 156 can be configured to perform said determination by determining whether the mobile device is associated with a user assigned to the group.

Further, one or more of these server components (e.g., the repository application 156) can be configured to respond to mobile device requests for instructional modules. Specifically, such a set of components can be configured to (1) receive, from a mobile device, a request for at least a portion of at least one instructional module of at least one group stored on the server, (2) determine whether the mobile device has access permission to access the instructional module from the server, and (3) respond to a determination that the mobile device has said access permission by accessing the at least one instructional module from the server and sending at least the requested portion of the instructional module to the mobile device.

In some embodiments, changes made to a server's content repository 152 can be automatically pushed out to the associated team of mobile devices. For example, each server's repository application 156 can be configured to identify one or more mobile devices associated with a group containing a modified instructional module, and to send some or all of the modified instructional module to the identified mobile devices.

It will be understood that the mobile device 10 of FIG. 1 can include any of a variety of different available types of computer hardware, firmware, software, operating systems, and network interfaces, including and in addition to those shown. The text input interface 16 can comprise, for example, a keyboard (actual or touch screen). Also, it will be understood that the digital camera 12 and the digital video camera 14 can be the same hardware component.

It will be appreciated that the mobile device 10, computer server 150, or other device running any of the application components described herein can include a search interface for searching any of the aforementioned content repositories, e.g., for content involving specific topics or authors. For example, a search interface 166 can be associated with the repository application 156. The search interface is preferably configured to respond to users' queries by searching the repository's content and/or associated metadata to find content relating to the queries, and reporting the found content to the users as search results. In some embodiments, a content repository can be configured to report a content ID and/or version number for specific content stored in the repository to a user that requests or searches for such content via the user's mobile device or other device. This functionality permits users to confirm whether an instructional module version stored on another device (e.g., another mobile device in a proposed peer-to-peer transfer of the module) is the latest version of the module. Upon using the search interface 166 to search for and find instructional modules of interest, a user can use the transfer components 116 and 158 to download instructional modules for local caching and/or storage in the local content repository 152, from which the modules can be retrieved and played back on the mobile device 10, even without a connection to the server 150.

Mobile devices in wide use employ a variety of different platforms and operating systems, sometimes requiring different media formats, codecs, and/or resolutions. In some embodiments, the presently described systems include an application component that creates and/or indexes separate versions of instructional content for said different platforms and operating systems, so that users of disparate devices can seamless share access to content. For example, if an instructional content module 122 or repository application 156 receives a request to transfer specific content to a user's mobile device 10, it can be configured to select a version of the content that has a file format (e.g., codec, resolution) that is compatible with the user's device.

In certain embodiments, the present invention provides a group cooperation application component (or, more simply, a "group cooperation component") 124 residing on the mobile device 10. This component can be configured to cooperate with a group of other mobile devices to support the formation of the group on an ad hoc basis, for the purposes of sharing access to instructional content, exchanging commentary among group members on the content, and using the mobile devices to collaborate with other users in editing the content. For example, an ad hoc group can be formed based partially on the users' physical proximity to each other, and can employ wired or wireless auto-discovery to detect nearby mobile devices that can be invited to join the group, or that are attempting to join the group irrespective of whether they received an invitation. The group cooperation components 124 can allow a group leader to select a mode of group subscription (e.g., "explicit acceptance" can mean that only authorized users are allowed into the group, while "implicit acceptance" can mean that any user can join the group). Such ad hoc group formation can be useful to privately share communications, tactical plans, and strategies in various endeavors, such as in-the-field military operations, impromptu snowball fights, and many other activities.

Thus, in certain embodiments, the group cooperation component 124 can be configured to (1) define or join a group of handheld mobile computing devices, (2) use the mobile device's network interface to communicate with the computer server 150 associated with the content repository 152 of instructional modules associated with the group, a portion of the content repository 152 corresponding to the group being created at the instruction of the one of the mobile devices of the group, (3) obtain at least a portion of an instructional module stored in the content repository 152, and (4) upload to the content repository 152 at least a portion of an instructional module authored or edited using the authoring application 112.

The group cooperation components 124 of the group of devices can be configured to cooperate with each other (and possibly with a group management component of a computer server or other device, such as the repository application 156) to store different portions of the shared content on different ones of the mobile devices. Preferably, each mobile device of the group can execute or play back the content as though it were entirely stored on the device itself, when in reality the group cooperation component 124 acquires (e.g., streams) portions of the viewed content directly from another one of the mobile devices of the group. Preferably, the group cooperation component 124 supports the ability to exclude non-group mobile devices from sharing the content associated with the group. Preferably, the group cooperation component 124 is configured to initially request a content ID and/or version number from another one of the mobile devices of the group that indicates that it has stored certain specified content, and then communicate with a centralized index (stored, e.g., on the computer server 150, on one of the mobile devices of the group, or another device) to verify whether the content ID is correct and/or the version number is the most recent one available.

For peer-to-peer communications with other mobile devices, the group cooperation component 124, access control component 114, or another component can be configured to (1) authenticate membership in the group for mobile devices seeking to engage in peer-to-peer transfers of at least portions of instructional modules with the group cooperation component's mobile device, and (2) conduct said peer-to-peer transfers of instructional modules to and from mobile devices that have been authenticated as members of the group.

In some embodiments, the group cooperation component 124, transfer component 116, or another component can be used to facilitate secure communications with other group members' mobile devices. In a messaging context, the group cooperation component 124 can be configured to (1) receive message data via a user interface of the mobile device, (2) receive an identification of a mobile device of the group, and (3) use the network interface to send the message data to the identified mobile device.

In some embodiments, the instructional module agent 50 is configured to cooperate with instructional module agents 50 of the mobile devices 10 of the group to form the group without any of the mobile devices 10 communicating with the server 150. For example, the instructional module agent 50 can be configured to perform said cooperation by using a GUID to prevent "collisions," such as the assignment of the same identification number to two different content/media files among the group.

In addition to supporting the rapid creation and editing of individual multimedia instructional modules, the application components described herein can also facilitate group access to meaningful "meta-modules" or groupings of instructional modules based on the needs of a group formed on an ad hoc basis as described above. For example, in a military context, suppose that a group of mechanized infantry is planning a mission on a six-Humvee convoy, and that there is a known list of 28 common maintenance tasks that may need to be performed in the field (e.g., changing a tire, dealing with an overheated radiator, detaching and reattaching antennae to drive under bridges, etc.). When the group leaders for the different Humvee teams gather together to receive or plan their mission, they can form an ad hoc group of mobile devices as described above. For example, the group leaders for the different Humvees can each activate their mobile devices to "join" or "subscribe" to the group as it is formed ad hoc. One of the group members (or someone else) then selects a "meta-module" or grouping of instructional modules (e.g., "Humvee Field Reference Guide"), which packages the aforementioned 28 common maintenance tasks into a single data collection, and the meta-module is downloaded to the group leaders' mobile devices. If the meta-module is too large for a single device, different portions of it can be on different devices of the group, as described above.

Preferably, the group cooperation components 124 support an ability to adjust the degree of redundancy of instructional content stored on the mobile devices of an ad hoc group. For example, a group cooperation component can be configured to allow a user to select "maximum redundancy," "maximum efficiency," or some level in between. Maximum redundancy is characterized by a high degree of redundancy in the data stored on the various mobile devices of the group. In the most extreme example of maximum redundancy, each mobile device of the group stores all of the instructional content. In contrast, the most extreme example of "maximum efficiency" involves zero redundancy—each device stores a completely different portion of the content that is shared among the group. Skilled artisans will understand that certain portions of the instructional content may be so important that they should be stored on all (or at least more than one) of the mobile devices, to enhance the availability of the content should some the group members become split up and unable to stream content from the split off mobile devices. Certain other portions of the content may be relatively less important and not worth storing on more than just a few (or just one) mobile device. The mobile device software of the present application can include features for allowing users to identify said important and relatively less important content portions, to enable the group cooperation components 124 to execute a distributing caching and redundancy plan that effectively manages the risks associated with group separation.

With further regard to the creation of meta-modules, different authors may want to compile different groups of individual instructional modules for different or even the same purposes. For example, a first author's meta-module for learning a particular language (e.g., "How to Speak French") may differ from a second author's meta-module on the same topic. While the two meta-modules might share a few individual instructional modules, the overall effects of the different meta-modules can differ. One author's meta-module might focus on perfecting grammar, while the other author's meta-module might focus more on achieving casual, conversational capability. The availability of meta-modules can also make searching more effective, as users do not have to search for each of the individual modules of a meta-module. As with individual modules, at least some embodiments of the invention facilitate the ability of users to rate or vote on meta-modules, and overall ratings averages can be communicated to users to guide their content selections.

In certain embodiments, the present invention provides an application component that resides on a mobile device and allows an author (e.g., a user of the mobile device) to create and edit instructional modules for a learning management system (LMS) that is accessible by students via the students' mobile devices. The LMS can be SCORM-compatible.

In certain embodiments, the present invention provides a method and mobile device system that enables an author to use a mobile device to capture illustrative multimedia content, such as images, audio, and video, and to augment that content with commentary or metadata in the form of an instructional module. The commentary can take the form of text, audio data, and/or video data, and can comprise, for example, commentary by the author or another individual. The augmentation can comprise an overdubbing of new audio over an original audio signal of the captured content. For example, suppose the audio in a captured video is difficult to understand due to background noises. The author may want to overdub new audio onto the video to clarify the problem. In another example, the content can be customized for users that speak different languages by overdubbing verbal commentary in the various languages. Additionally, any number of audio signals can be combined together as desired (e.g., verbal commentary from multiple different individuals). Further, the instructional module created by the author can include scrolling text, and the audio augmentations can be attached to specific portions of the scrolling text and only played when the portion of the text appears on the viewer's screen. The aforementioned metadata can comprise information useful in classifying or indexing the content, so that it can be searched for more easily. In certain embodiments, the author can review the captured content and edit (e.g., crop, adjust, recapture) it.

In certain embodiments, the present invention provides a mobile device authoring application for creation and editing of instructional modules, comprising one or more of the following features:

- a mobile device resident application component for authoring and editing a presentation or instructional module for playback on the same or another mobile device based on a set of instructions contained within the instructional module;
- the instructions comprise step by step instructions or branching set of step by step instructions;
- the mobile device application component supports embedding any combination of text, drawings, pictures, maps, software, vibrations, audio, video, or content selected or derived from the output of sensors installed in the mobile device into the presentation;
- the mobile device application component supports the modification of any of text, drawings, pictures, maps, software, vibrations, audio, video, or content selected or derived from the output of the sensors installed in the mobile device, insofar as such data appears in the presentation; and the mobile device application component enables the use of the mobile device for writing text, logging data, recording or otherwise capturing sounds or vibrations, taking photographs, capturing video, or capturing the output of other sensors installed in the mobile device and embedding that content into the presentation.

In certain embodiments, the present invention provides a mobile device playback application for presentation of instructional module content, comprising one or more of the following features:

a mobile device resident application component that initiates and manages playback of a module;

the mobile device application component delivers or displays descriptive information about a selected module to the user of the mobile device, possibly including quality control metrics such as results of a voting process, number of times the module has been accessed, module author, module size, module ratings, and related module information and metrics;

the mobile device application component manages sensor data from the mobile device, which data can be automatically diagnosed or otherwise used to drive logic and branching decisions within a module (e.g., to select and/or recommend instructional presentation content for playback and/or editing on the mobile device); and the mobile device application component provides links and/or other direct access to a virtual community as described elsewhere herein.

In certain embodiments, the present invention provides a user identification and access control application component comprising one or more of the following features:

a mobile device resident application component that prompts a user for user-identifying information;

the mobile device application component attaches author identification information to instructional modules created on the mobile device;

an access control application component, residing on the mobile device or on a computer server, that permits access to descriptive information, instructional modules, and classes of instructional modules based upon the identity of a user or user-associated information such as security clearance, when such content is requested to be transferred to the user's mobile device from a content repository of the computer server or a local store on another mobile device; and the access control application component permits conditional transfer of instructional module content to a user's mobile device from the content repository of the computer server or from a local store on another mobile device based on conditions such as user identity, payment status, author-produced restrictions or security clearance.

In certain embodiments, the present invention provides an instructional content repository and content management system comprising one or more of the following features:

a server-based repository of instructional modules and associated descriptive content and metadata created for delivery to and playback on mobile devices, the repository being stored on a computer server, local computer, local network, and/or organizational network;

tools to organize said content alphabetically or by metadata such as subject, author, keyword, or any other fashion appropriate for catalogued, searchable content;

a system for management of dependencies within modules, such as allowing photos, logos, videos, audio, text, etc., to be used in multiple instructional modules while maintaining the appropriate content access privileges, version control, etc.

a mobile device-based repository of instructional modules and associated descriptive content and metadata created for delivery to and playback on mobile devices;

mobile device-based tools to organize the content of the mobile device-based repository alphabetically by descriptive data or metadata such as subject, author, keyword, or any other fashion appropriate for catalogued, searchable content;

a tracking system to monitor modules by author, keyword, and subject or other associated data or metadata;

a module content version control system that determines whether a version of an instructional module stored on a mobile device is the most current version of the module stored in a content repository of a computer server, local computer, local network, or organizational network;

a voting system or other feedback system that analyzes viewers' quality ratings of an instructional module to tabulate an average or consensus quality rating of the instructional module, and preferably associates voting information with the particular instructional module;

an application component configured to evaluate and/or categorize newly authored instructional content for the purpose of maintaining an assured functionality and appropriateness of the instructional content;

an application component configured to evaluate and categorize content authors for the purpose of maintaining the assured functionality and appropriateness of instructional content;

an application component configured to evaluate and categorize instructional content for the purpose of establishing user access to particular content or classes of content to conform to classification or security requirements;

repository of information stored on the computer server, local computer, local network, organizational network, or mobile device, the information used to determine status for the conditional transfer of instructional modules and the descriptive content and metadata associated therewith from the repository;

a repository of information stored on the computer server, local computer, local network, or organizational network, the information used to determine status for the conditional transfer of instructional modules and the descriptive content and metadata associated therewith from a mobile device-based repository;

a diagnosis component stored on the computer server, local computer, local network, or organizational network, the diagnosis component (e.g., computational software) configured to enable computation, analysis, and/or comparison of data acquired from sensors of a mobile device as part of the execution of an instructional module;

a repository of information stored on the computer server, local computer, local network, or organizational network, the information enabling said computation, analysis, and/or comparison of data acquired from the sensors of the mobile device as part of the execution of an instructional module; and user tracking functions to provide learning management functionality and/or links to a standalone learning management system.

In certain embodiments, the present invention provides an instructional content transfer application comprising one or more of the following features:
- a mobile device resident application component that initiates and/or manages transfer of an instructional module and/or descriptive content and metadata associated therewith from the mobile device to a content repository on a computer server, local computer, local network, organizational network, or another mobile device;
- an application component that initiates and/or manages transfer of an instructional module and/or descriptive content and metadata associated therewith from a content repository to the mobile device, wherein the content repository is stored on a computer server, local computer, local network, organizational network, or another mobile device;
- an application component that manages transfer of acquired mobile device sensor data for purpose of computation, analysis, and/or comparison as part of the execution of an instructional module;
- a tracking system to monitor, record, and/or manage the use of instructional content downloaded by individual mobile device users, which may be achieved by linking to a separate learning management system;
- an application component that automatically notifies mobile device users about instructional module updates available to the users' mobile devices; and
- a system to support the sale of the mobile device application components and instructional modules, including transaction management and download support for both server to mobile device and mobile device to mobile device transactions.

In certain embodiments, the present invention provides a virtual community system comprising one or more of the following features:
- a chat system to enable communication between individual users of specific modules of instructional content;
- a voting and/or rating system that allows the users to rate modules of instructional content;
- an email system that enables email communications between individual users;
- a voting and/or rating system that allows users to rate instructional content authors;
- individual user access portals for categories of instructional content;
- individual user access portals for categories of users;
- a software component that manages access to instructional content via web browsers;
- access portals to social networking applications (such as Facebook or Twitter) for the purpose of fostering the virtual community;
- a system to deliver advertisements to users' mobile devices based on instructional content used or browsed by the users;
- personalized author home pages;
- subscription services;
- personalized user home pages;
- customized home pages for groups of the users;
- capability to hyperlink across user and author home pages;
- a private comment system for receiving and compiling users' comments, the private comment system configured to limit access to the comments to groups or explicitly identified individuals;
- a public comment system for receiving and compiling users' comments, the public comment system configured to permit access to the comments to all of the users of the virtual community;
- a security component configured to apply password protection to instructional content; and
- a group creation and management component that allows users to form ad-hoc groups.

While the aforementioned systems and methods are described in the context of "instructional content," it will be appreciated that the aspects described above can be implemented for other types of content, and such implementations are within the scope of the presently described embodiments.

Embodiments of the invention are operational with numerous other general purpose or special purpose computing system environments or configurations. For examples, an authoring application 112 could be provided on a server, home computer, notebook computer, tablet, and the like. Examples of well-known computing systems, environments, and/or configurations that may be suitable for use with the invention include, but are not limited to, personal computers, server computers, hand-held or laptop devices, multi-processor systems, microprocessor-based systems, programmable consumer electronics, network PCs, minicomputers, mainframe computers, distributed computing environments that include any of the above systems or devices, and the like.

Computer-implemented steps for processing information in the system can be implemented in software, firmware or hardware and include any type of programmed step undertaken by components of the system.

A Local Area Network (LAN) or Wide Area Network (WAN) may be a corporate computing network, including access to the Internet, to which computers and computing devices comprising the system are connected. In one embodiment, the LAN conforms to the Transmission Control Protocol/Internet Protocol (TCP/IP) industry standard.

A microprocessor may be any conventional general purpose single- or multi-chip microprocessor such as a Pentium® processor, Itanium® processor or an ALPHA® processor. In addition, the microprocessor may be any conventional special purpose microprocessor such as a digital signal processor (DSP) or a graphics processor. Any of the devices described herein can include a microprocessor for providing a computer system.

Embodiments of the system are comprised of various modules as discussed in detail below. As can be appreciated by one of ordinary skill in the art, each of the modules can comprise various sub-routines, procedures, definitional statements and macros. Each of the modules are typically separately compiled and linked into a single executable program. Therefore, the preceding description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as LINUX, UNIX or MICROSOFT WINDOWS®. The system may be written in any conventional programming language such as C, C++, BASIC, Pascal, Perl, or Java, and run under a conventional operating system.

Any embodiment of the invention disclosed herein may be implemented as a method, apparatus or article of manufacture using standard programming or engineering techniques to produce software, firmware, hardware, or any combination thereof. An "article of manufacture" can include code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more exemplary aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

When implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the present disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" or an "example" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted herein in a particular order, this should not be understood as requiring that such operations be performed in the particular order described or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

Various embodiments of this disclosure have been described. These and other embodiments are within the scope of the following claims.

We claim:

1. A mobile handheld computing device comprising:
  a local content store; a network interface;
  one or more media playback components; one or more content capture components;
  an instructional module agent comprising an authoring application and a playback application; and
  a computer processor operative to implement the instructional module agent, operatively coupled to the one or more media playback components, the one or more content capture components, and the network interface, and communicatively coupled to the local content store;

wherein the authoring application is configured to allow an author to:
create and edit an one or more instructional modules, each instructional module comprising a first media playback step, a second media playback step, and a third media playback step;
use one of the content capture components to capture a first content, a second content, and a third content;
associate the first content with the first media playback step, the second content with the second media playback step, and the third content with the third media playback step;
configure a sequence for each of the one or more instructional modules, the sequence including a first branch from the first media playback step to the second media playback step and a second branch from the first media playback step to the third media playback step;
superimpose text and audio over video content of one or more of the first content, the second content, and the third content; and
select an access level for each user of other mobile devices of one or more of the first content, the second content, or the third content, the access level determining whether each user may edit one or more of the first content, the second content, or the third content;
set a permission level of each of the one or more instructional modules, each permission level determining a set of users that have access to each of the one or more instructional modules;

wherein the playback application is configured to:
play the first content associated with the first media playback step of the instructional module using the one or more media playback components;
receive data from a sensor of the mobile device, the data indicating an attribute of an object that is a subject of at least one of the one or more instructional modules;
compare the data from the sensor of the mobile device to predefined data;
select the first branch based on a result of the comparison; and
play the second content associated with the second media step in response to selecting the first branch;

wherein:
the instructional module agent is configured to respond to at least one of the creation and editing of the one or more instructional modules using the authoring application by automatically uploading at least a portion of the one or more instructional modules to a content repository of instructional modules stored on a plurality of computer servers, wherein uploading comprises using the network interface to transmit the instructional module via one or more data communication networks;
each of the plurality of computer servers comprises a distinct permission level, the plurality of computer servers arranged in a hierarchy based on each distinct permission level such that each of the plurality of computer servers has access to each of the plurality of computer servers having a lower distinct permission level;
each of the one or more instructional modules are uploaded to a particular one of the plurality of computer servers based on the permission level of a particular one of the one or more instructional modules matching the distinct permission level of the particular one of the plurality of computer servers;
the instructional module agent is configured to retrieve a plurality of the instructional modules from the content repository based on a permission level of the mobile handheld computing device; and
the plurality of the instructional modules are retrieved from a subset of the plurality of computer servers that have distinct permission levels that are less than or equal to the permission level of the mobile handheld computing device.

2. The mobile computing device of claim 1, wherein said one or more media playback components comprise a visual display configured to display text, images, and video.

3. The mobile computing device of claim 1, wherein said one or more media playback components comprise one or more audio speakers or a headphone jack configured to generate audible sounds.

4. The mobile computing device of claim 1, wherein said one or more content capture components comprise a microphone configured to receive audible sounds.

5. The mobile computing device of claim 1, wherein said one or more content capture components comprise a camera configured to capture at least one of images and video.

6. The mobile computing device of claim 1, wherein said one or more content capture components comprise a text input interface configured to receive text input.

7. The mobile computing device of claim 1, wherein the instructional module is stored in the local content store and wherein the playback application is further configured to:
retrieve, from the local content store, a media playback step of the instructional module;
retrieve, from the local content store, media associated with the retrieved media playback step; and
display or play the retrieved media using the one or more media playback components.

8. The mobile computing device of claim 1, wherein the instructional module is stored on another computer connected to one of the data communication networks and wherein the playback application is further configured to:
use the network interface to retrieve, from the other computer, a media playback step of the instructional module;
use the network interface to retrieve, from the other computer, media associated with the retrieved media playback step; and
display or play the retrieved media using the one or more media playback components.

9. The mobile computing device of claim 1, wherein when the instructional module is authored using the authoring application, the instructional module agent is configured to:
receive a selection of one or more presentation groups of a plurality of presentation groups associated with the content repository of instructional modules; and
send the selection to the one or more computer servers during said automatic uploading of the authored instructional module to the content repository.

10. A method of creating an instructional module using a mobile handheld computing device, comprising:
defining a first media playback step, a second media playback step, and a third media playback step;

using a content capture component of the mobile device to capture a first content, a second content, and a third content;

associating the first content with the first media playback step, the second content with the second media playback step, and the third content with the third media playback step;

configuring a sequence for the instructional module, the sequence including a first branch from the first media playback step to the second media playback step and a second branch from the first media playback step to the third media playback step;

superimposing text and audio over video content of one or more of the first content, the second content, and the third content; and setting an access level for each user of other mobile devices of one or more of the first content, the second content, or the third content, the access level determining whether each user may edit one or more of the first content, the second content, or the third content;

setting a permission level of the instructional module, the permission level determining a set of users that have access to the instructional module;

configuring a first condition for the first branch and a second condition for the second branch, each condition being based on a result of comparing data from a sensor of the mobile computing device to predefined data, the data from the sensor of the mobile computing device indicating an attribute of an object that is a subject of the instructional module;

responding to the creation of the instructional module by automatically uploading at least a portion of the instructional module to a content repository of instructional modules stored on a plurality of computer servers, wherein said uploading comprises using a network interface of the mobile device to transmit the instructional module via at least one data communication network, wherein:

each of the plurality of computer servers comprises a distinct permission level, the plurality of computer servers arranged in a hierarchy based on each distinct permission level such that each of the plurality of computer servers has access to each of the plurality of computer servers having a lower distinct permission level; and the instructional module is uploaded to a particular one of the plurality of computer servers based on the permission level of the instructional module matching the distinct permission level of the particular one of the plurality of computer servers; and retrieving a plurality of the instructional modules from the content repository based on a permission level of the mobile handheld computing device, wherein:

the plurality of the instructional modules are retrieved from a subset of the plurality of computer servers that have distinct permission levels that are less than or equal to the permission level of the mobile handheld computing device; and the method is performed by the mobile computing device.

* * * * *